(12) United States Patent
Morgan

(10) Patent No.: US 10,421,555 B2
(45) Date of Patent: Sep. 24, 2019

(54) AIRCRAFT FUEL SYSTEM

(71) Applicant: Airbus Operations Limited, Bristol (GB)

(72) Inventor: Angus Morgan, Bristol (GB)

(73) Assignee: Airbus Operations Limited, Bristol (GB)

( * ) Notice: Subject to any disclaimer, the term of this patent is extended or adjusted under 35 U.S.C. 154(b) by 422 days.

(21) Appl. No.: 15/415,075

(22) Filed: Jan. 25, 2017

(65) Prior Publication Data

US 2017/0210482 A1 Jul. 27, 2017

(30) Foreign Application Priority Data

Jan. 27, 2016 (GB) .................................. 1601492.0

(51) Int. Cl.
*B64D 37/02* (2006.01)
*B64D 37/08* (2006.01)
*B64C 3/34* (2006.01)

(52) U.S. Cl.
CPC ............... *B64D 37/08* (2013.01); *B64C 3/34* (2013.01); *Y02T 50/44* (2013.01)

(58) Field of Classification Search
CPC ........ B64D 37/02; B64D 37/04; B64D 37/06; B64D 37/08; B64D 37/14; B64D 37/16; B64D 37/20; B64D 37/22; B64C 3/34
See application file for complete search history.

(56) References Cited

U.S. PATENT DOCUMENTS

| | | | | |
|---|---|---|---|---|
| 3,419,233 A * | 12/1968 | Wotton | ................... | B64D 37/14 244/135 R |
| 6,997,415 B2 * | 2/2006 | Wozniak | ................. | B64C 17/10 244/135 C |
| 2011/0056973 A1 * | 3/2011 | Lynas | ....................... | B64C 3/34 220/745 |
| 2011/0147522 A1 | 6/2011 | Williams | | |
| 2011/0284694 A1 * | 11/2011 | Yamaguchi | ............... | B64C 3/34 244/135 R |
| 2012/0018246 A1 | 1/2012 | Pietro et al. | | |

(Continued)

FOREIGN PATENT DOCUMENTS

JP 3-123798 12/1991
WO WO 2012/101439 8/2012

OTHER PUBLICATIONS

European Search Report cited in EP 17 15 1873, dated Jun. 23, 2017, six pages.

*Primary Examiner* — Richard G Davis
(74) *Attorney, Agent, or Firm* — Nixon & Vanderhye P.C.

(57) ABSTRACT

An aircraft fuel system has a bottom wall, and a rib with a bottom edge joined to the bottom wall. The rib provides a boundary between first and second compartments. At least the first compartment is arranged to carry fuel. An open recess is in the bottom edge of the rib and a rib sealing arrangement between the bottom edge of the rib and the bottom wall prevents fuel from flowing across the bottom edge of the rib except at the open recess. The system has a pump and a conduit coupled at one end to the open recess and at another end to the pump. The open recess and the conduit provide a fuel flow path across the bottom edge of the rib from the first compartment into the pump. The flow path is sealed to prevent fuel flowing out of the flow path into the second compartment.

20 Claims, 7 Drawing Sheets

(56) References Cited

U.S. PATENT DOCUMENTS

| | | | |
|---|---|---|---|
| 2014/0048651 A1* | 2/2014 | Haskins | B64C 3/187 244/123.1 |
| 2015/0041004 A1* | 2/2015 | Komoda | B64D 37/04 137/565.01 |
| 2015/0048210 A1 | 2/2015 | Montgomery | |

* cited by examiner

AIRCRAFT FUEL SYSTEM

CROSS RELATED APPLICATION

This application claims priority to Great Britain patent application 1601492.0 filed Jan. 27, 2016, the entirety of which is incorporated by reference.

FIELD OF THE INVENTION

The present invention relates to an aircraft fuel system.

BACKGROUND OF THE INVENTION

Fuel in an aircraft is typically stored in one or more fuel tanks or sealed compartments located in the interior space of the wings and fuselage of the aircraft. A fuel delivery system includes one or more fuel pumps arranged to draw fuel from the fuel tank(s) and deliver fuel to the engine(s).

The location of the fuel pump within a fuel compartment can be restricted, for example by the irregular shape of the fuel compartment, internal structural components, or the physical size of the fuel pump. When the fuel pump is not located at the lowermost point in the compartment, the fuel pump is unable to empty the fuel compartment of fuel. Conventional aircraft fuel systems therefore suffer from the problem of unusable fuel (also known as residual fuel)—that is, fuel which cannot be fed out of the fuel tank because it is trapped in a low or inaccessible region.

The weight of unusable/residual fuel is included in the empty weight of the aircraft. This extra empty weight reduces the aircraft operator's permitted usage of the aircraft in terms of range, passengers and cargo.

SUMMARY OF THE INVENTION

A first aspect of the invention provides an aircraft fuel system comprising a bottom wall; a rib with a bottom edge joined to the bottom wall, the rib providing a boundary between first and second compartments, at least the first compartment being arranged to carry fuel when the system is in use; an open recess in the bottom edge of the rib; a rib sealing arrangement between the bottom edge of the rib and the bottom wall which prevents fuel from flowing across the bottom edge of the rib except at the open recess; a pump for pumping fuel from the first compartment; and a conduit coupled at one end to the open recess and at another end to the pump, the open recess and the conduit together providing a flow path for fuel to flow across the bottom edge of the rib from the first compartment into the pump, wherein the flow path is sealed so that the fuel flowing along the flow path is prevented from flowing out of the flow path into the second compartment.

A second aspect of the invention provides an aircraft wing comprising an aircraft fuel system according to the first aspect, wherein the bottom wall of the fuel system is a bottom skin of the wing.

A third aspect of the invention provides an aircraft comprising an aircraft fuel system according to the first aspect.

Placing the fuel pump external to the compartment being served by the fuel pump enables the fuel pump to be located at or below the lowermost position of the compartment. The fuel pump may be located in the second compartment, or some other part of the fuel system. A sealed flow path enables fuel to be drawn from the first compartment into the pump. The unusable or residual fuel is therefore significantly reduced or removed entirely.

The conduit is fluidically coupled at one end to the open recess and at another end to the pump, so that fuel can flow from the first compartment into the pump via the conduit. The conduit may terminate at the rib—for instance it may be attached to the rib by an end flange which forms a sealed joint between the conduit and the rib.

The rib sealing arrangement typically provides a liquid-tight joint between the bottom edge of the rib and the bottom wall. For example the rib sealing arrangement may be provided by a layer of sealant, one or more gaskets, and/or one or more seal plates.

The bottom edge of the rib may include a plurality of rib feet joining the bottom edge of the rib to the bottom wall, and the system further comprises: a plurality of sealed stringers which are carried by the bottom wall, each sealed stringer passing through a respective sealed recess between a respective pair of the plurality of rib feet; the rib sealing arrangement comprising a plurality of rib seal members, such as seal plates, each providing a seal which prevents fuel in the first compartment from flowing through a respective one of the sealed recesses into the second compartment; and a further pair of stringers which are carried by the bottom wall and pass through the open recess between a further pair of the plurality of rib feet, wherein the conduit is coupled at the one end to the open recess between the further pair of stringers. The stringers serve to stiffen the bottom wall.

Typically no part of the rib lies between the open recess and the bottom wall. In other words, the open recess is a "mouse-hole" type opening at the bottom edge of the rib rather than a closed hole bounded on all sides by the rib.

Typically a lower boundary of the conduit is provided by the bottom wall. The conduit may be provided by the bottom wall, the further pair of stringers and a stringer cap fitted to the further pair of stringers in the second compartment, and the stringer cap is sealed to the rib and to the further pair of stringers so that the fuel flowing along the flow path is prevented from flowing out of the flow path into the second compartment.

The stringer cap may be joined to the further pair of stringers by clamps, clips or fasteners for example. The stringer cap typically terminates at the rib. Optionally the stringer cap does not pass through the open recess from the second compartment into the first compartment—in other words the stringer cap terminates in the second compartment.

The stringer cap may comprise an end flange which forms a sealed joint between the stringer cap and the rib so that fuel flowing along the flow path is prevented from flowing out of the flow path into the second compartment between the stringer cap and the rib. The end flange may be joined to the rib by fasteners for example. The end flange may be in the second compartment. Alternatively the stringer cap may pass through the open recess from the second compartment into the first compartment so that the end flange is located in the first compartment.

The rib may lie in a rib plane, the first compartment is positioned on a first side of the rib plane; and the conduit and pump are positioned on a second side of the rib plane (for instance in the second compartment).

The second compartment may be arranged to carry fuel when the system is in use, like the first compartment; or it may be a "dry" compartment which does not carry fuel.

The first compartment may be oriented so that it has a low point at the open recess.

The system typically further comprises a top wall, and a rib sealing arrangement between a top edge of the rib and the top wall which prevents fuel from flowing between the rib and the top wall. The rib sealing arrangement typically provides a liquid-tight joint between the top edge of the rib and the top wall. For example the rib sealing arrangement may be provided by a layer of sealant, one or more gaskets, and/or one or more seal plates.

The aircraft may comprise a fuselage; and a wing which extends away from the fuselage, wherein the bottom wall of the fuel system is a bottom skin of the wing. The bottom wall may be angled upwardly as it extends away from the fuselage.

Typically the rib is an inboard rib which provides an inboard boundary of the first compartment, and the aircraft fuel system further comprises an outboard rib which is opposite the inboard rib and provides an outboard boundary of the first compartment positioned further away from the fuselage than the inboard boundary.

Typically the rib lies in a rib plane, the first compartment is positioned on a first side of the rib plane; and the pump is positioned entirely on a second side of the rib plane. For example the pump may comprise an inlet, a motor and an impeller which are positioned entirely on the second side of the rib plane.

Typically the rib lies in a rib plane, the first compartment is positioned on a first side of the rib plane; and the pump comprises an inlet for feeding the fuel from the first compartment into the pump via the conduit, wherein the inlet is positioned on a second side of the rib plane.

The pump is typically arranged to pump the fuel from the first compartment towards an engine, or some other part of the fuel system other than the second compartment. In general the pump is typically not arranged to pump the fuel from the first compartment into the second compartment.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
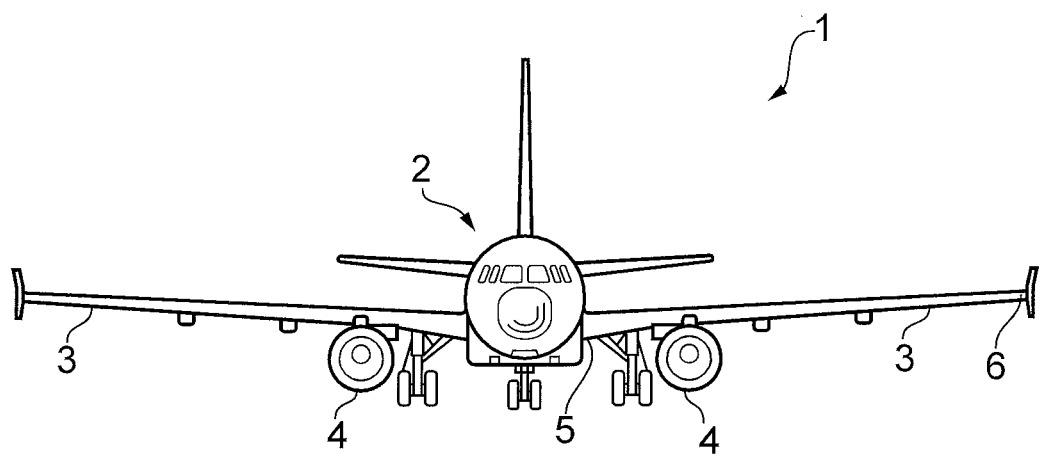
FIG. 1 shows a front view of an aircraft in accordance with an embodiment of the invention.

FIG. 1 shows an aircraft 1 including an embodiment of the fuel system of the present invention. The aircraft has a fuselage 2 and two wings 3 extending from either side of the fuselage 2. Each wing 3 extends in a spanwise direction from a wing root 5 where the wing meets the fuselage 2 to a wing tip 6. Each wing 3 is a dihedral wing, so the wing 3 is angled upwardly as it extends towards the wing tip 6. Engines 4 are located on the underside of each wing 3. FIG. 1 shows a single engine 4 on each wing, however the number and location of the engines may vary depending on the type of aircraft.

Figure 2:
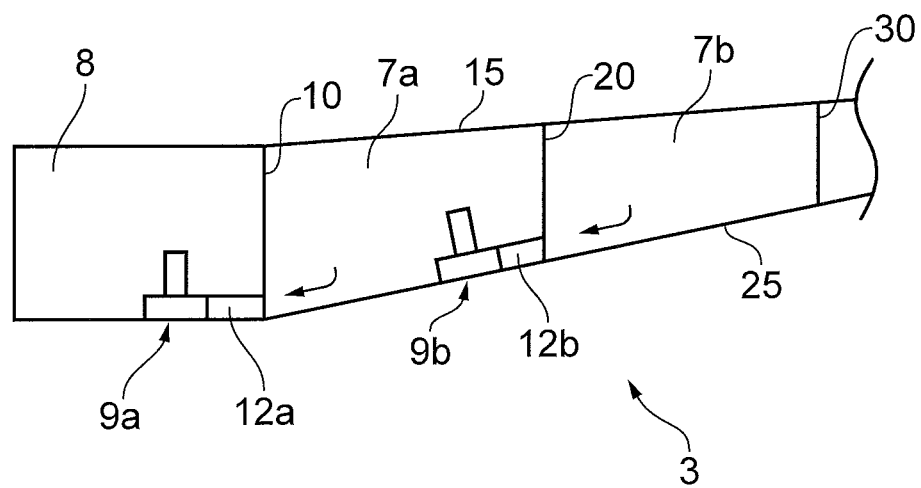
FIG. 2 is a schematic front view through part of the wing including a fuel system in accordance with an embodiment of the invention.

FIG. 2 is a schematic cross-sectional view through part of the fuel system of the aircraft 1, viewed from the front of the aircraft. FIG. 2 shows the fuel system within the port wing 3, the fuel system in the starboard wing being identical. The wing 3 includes a pair of spars (not shown) extending in a spanwise direction, and a number of substantially planar ribs 10, 20, 30 extending in a chordwise direction (perpendicular to the plane of FIG. 2) and located at intervals along the span of the wing. The wing 3 also has an upper skin 15 and a lower skin 25. The fuel system shown in FIG. 2 includes three fuel compartments 8, 7a, 7b which are separated from each other by the ribs 10, 20. Each fuel compartment has upper and lower walls provided by the skins 15, 25; fore and aft walls provided by the spars (not shown); and inboard and outboard walls provided by a pair of the ribs.

FIG. 2 shows a centre compartment 8 in the fuselage 2; an inboard compartment 7a at the root 5 of the port wing and bounded by the ribs 10, 20; and an outboard compartment 7b bounded by the ribs 20, 30. The port wing may have further fuel tanks (not shown) outboard of the rib 30.

The compartments 8, 7a, 7b are arranged to carry fuel when the aircraft and thus the fuel system are in use, and the fuel is fed to the engines 4 by a fuel delivery system including pumps 9a, 9b which will be described in further detail below.

Figure 3:
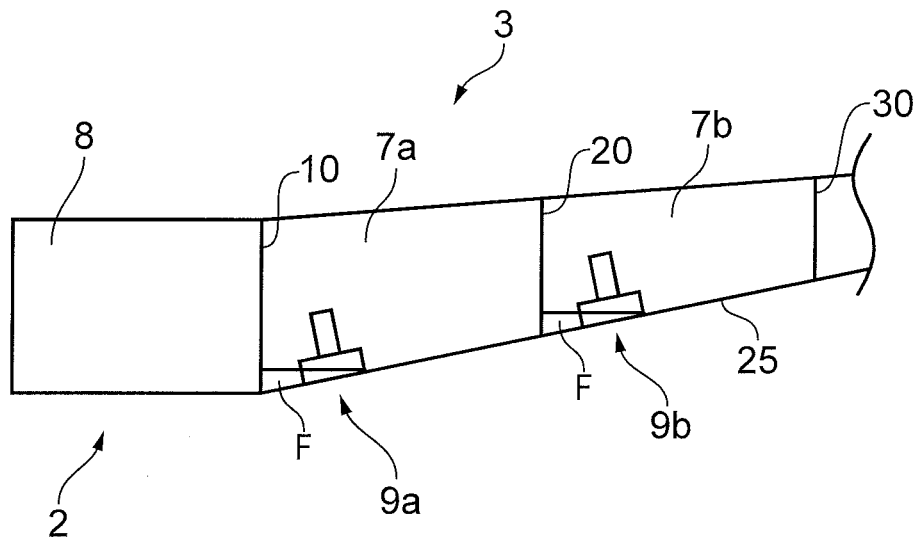
FIG. 3 is a schematic front view through part of an aircraft wing, not in accordance with the invention.

FIG. 3 is a schematic cross-sectional view through part of a fuel system not according to the present invention, which illustrates the unusable fuel problem addressed by the present invention. The various parts of the fuel system are labelled with the same reference numbers as in FIG. 2 so a direct comparison can be made. The dihedral angle of the wing means that when the fuel compartments 7a, 7b in the wing are nearly empty, then fuel collects at the low point of the compartments, which is at the junction where the inboard rib of the compartment meets the lower skin 25.

In FIG. 3 a pump 9a in the inboard compartment 7a is used to pump fuel from that compartment 7a into the engine 4; and similarly a pump 9b in the outboard compartment 7b is used to pump fuel from that compartment 7b into the engine 4. It is not possible to position the pumps 9a, 9b directly next to the inboard ribs 10, 20 so pools F of unusable fuel are left at the low point between the pump 9a, 9b and the inboard rib 10, 20.

In FIG. 2, the pumps 9a, 9b have been re-positioned compared with FIG. 3. That is, the pump 9a for pumping fuel from the inboard compartment 7a is positioned in the centre compartment 8 and connected to the inboard compartment 7a by a sealed conduit 12a; and similarly the pump 9b for pumping fuel from the outboard compartment 7b is positioned in the inboard compartment 7a and connected to the outboard compartment 7b by a sealed conduit 12b. Each rib 10, 20 lies in a rib plane, with a fuel compartment 7a,b positioned on an outboard side of the rib plane and a pump 9a, 9b and associated conduit 12a,b positioned on an inboard side of the rib plane.

This re-positioning of the pumps 9a, b means that they are now located at a height which is at or below the low point of the compartment which they serve. In other words the pump 9a is at about the same as the height of the low point of the inboard compartment 7a which it serves, and the pump 9b is below the low point of the outboard compartment 7b which it serves.

The ribs 10, 20 provide boundaries between the compartments 8, 7a, 7b, and are sealed around their peripheries to prevent fuel from flowing between the fuel compartments across the plane of the rib, except via the conduits 12a, b. The rib sealing arrangement between the bottom edge of the rib 20 and the lower skin 25 will now be described in detail with reference to FIGS. 4 and 5. This rib sealing arrangement prevents fuel from flowing between the bottom edge of the rib and the lower skin 25 except via the conduit 12b. A similar sealing arrangement is provided between the top edge of the rib 20 and the upper skin 15 so that fuel is prevented from flowing across the top edge if the rib. The ribs 10, 30 are sealed to the upper and lower skins in a similar fashion.

The rib 20 has a bottom edge comprising a plurality of rib feet 21 joining the bottom edge of the second rib 20 to the lower skin 25. The top edge of the rib 20 has similar rib feet 21 which join it to the upper skin 15. Each rib foot 21 comprises a first flange on one side of the rib plane with a pair of fastener holes 21a, and a second flange on the other side of the rib plane with a similar pair of fastener holes 21b.

Recesses 21c are formed in the edge of the rib between each adjacent pair of rib feet 21. Polysulphide sealant (not shown) is provided between each rib foot 21 and the skins 15, 25 to provide a liquid-tight joint and prevent fuel from flowing between the compartments across the rib feet 21.

A plurality of sealed stringers 26 extend spanwise along the lower skin 25, and act to stiffen the lower skin 25. The sealed stringers 26 are fastened to the lower skin 25 by fasteners (not shown). Each sealed stringer 26 passes through a respective one of the recesses 21c.

Figure 5:
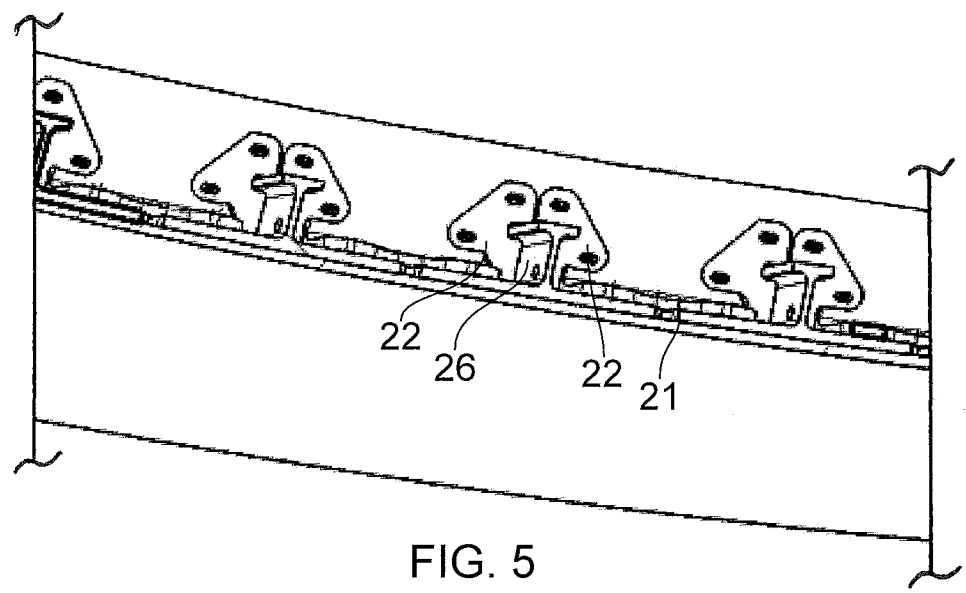
FIG. 5 is an enlarged perspective view of the bottom edge of the rib.

Sealing plates 22 shown most clearly in FIG. 5 seal the recesses 21c between the rib feet 21. Each sealing plate 22 is fastened to the rib 20 and a bead of polysulphide sealant (not shown) provides a liquid-tight joint between the sealing plate 22 and the sealed stringer 26 passing through the recess 21c. Thus each sealing plate 22 provides a seal which prevents fuel from flowing between the compartments 7a, b through a respective one of the sealed recesses 21c. Polysulphide sealant is also provided between each sealing plate 22 and the rib 20 to provide a liquid-tight joint and prevent fuel from flowing between the rib 20 and the sealing plates 20.

Figure 4:
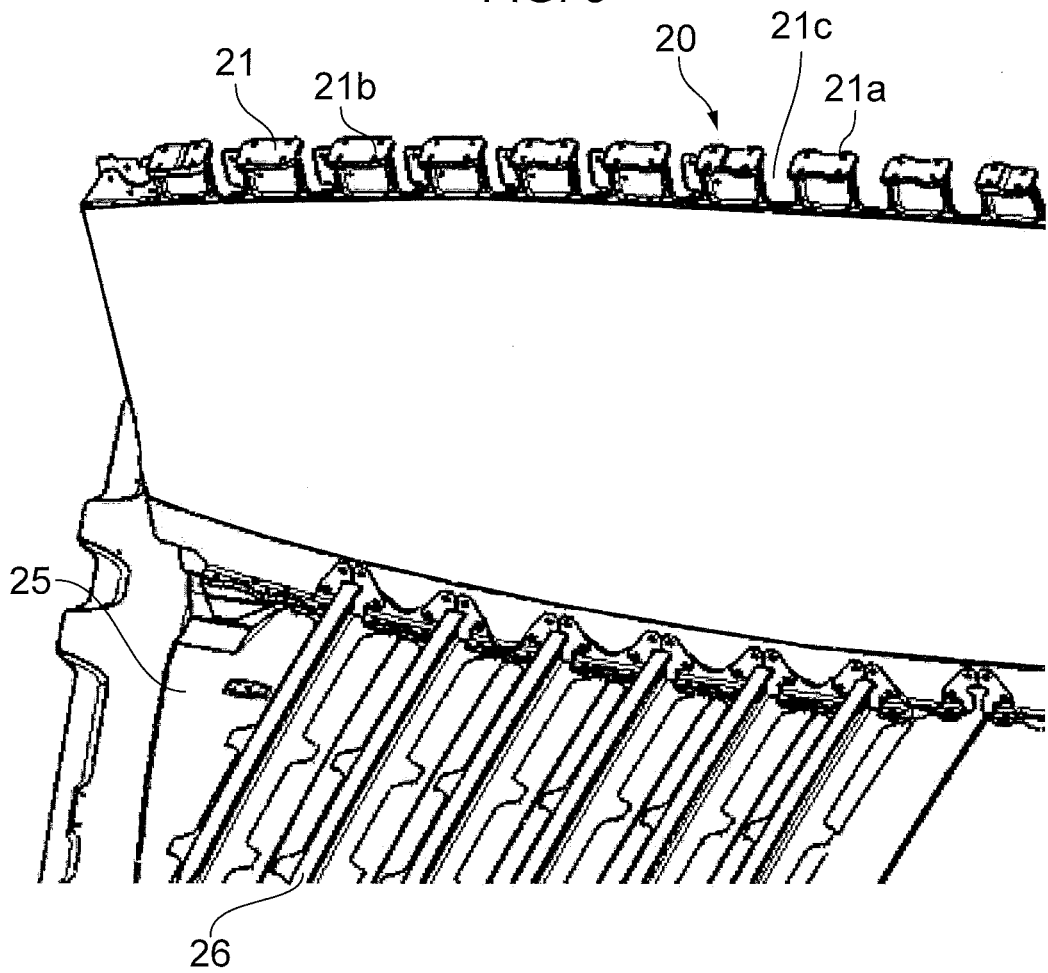
FIG. 4 is a perspective view of part of a rib and the bottom skin of the wing.
Figure 7:
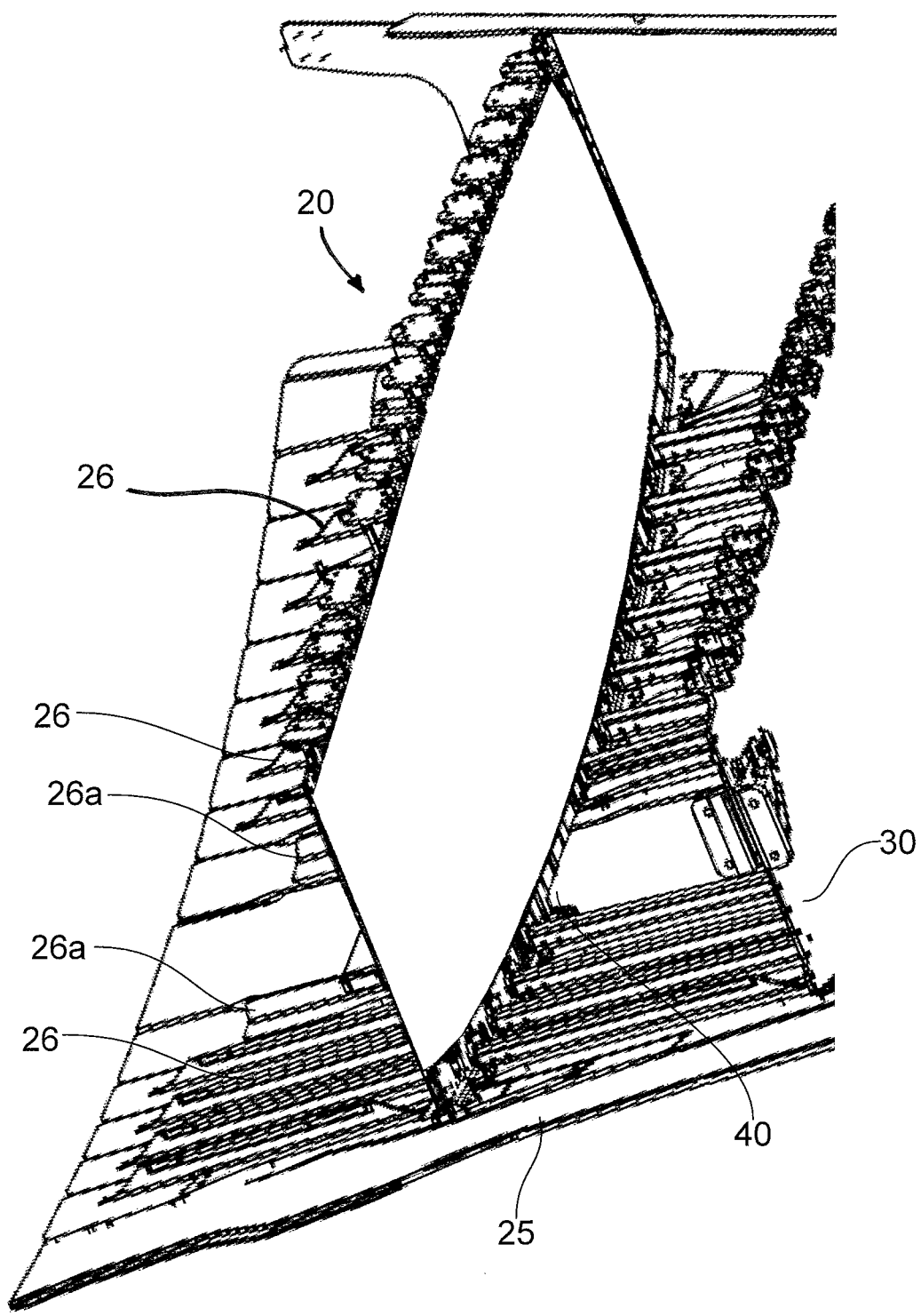
FIG. 7 is a perspective view of part of the aircraft wing.

FIG. 7 shows the rib 20 in its entirety. The lower skin 25 carries about eleven sealed stringers 26, six of which are shown in FIG. 4 and four of which are shown in FIG. 5. As described above, each sealed stringer 26 passes through a respective sealed recess 21c between a respective pair of the rib feet 21.

At the low point of the bottom edge of the rib 20 the bottom skin 25 carries a further pair of stringers 26a which are shown in FIGS. 7-11. The further pair of stringers 26a pass through an open recess 40 (shown most clearly in FIG. 12) between a further pair 21d, 21e of rib feet (shown in FIG. 9) which join the bottom edge of the rib to the bottom wall. The open recess 40 between the further pair of rib feet 21d, 21e is significantly wider than the sealed recesses 21c between the other adjacent pairs of rib feet (one of the sealed recesses 21c being shown in FIG. 9 with its sealing plates 22 removed).

Figure 6:
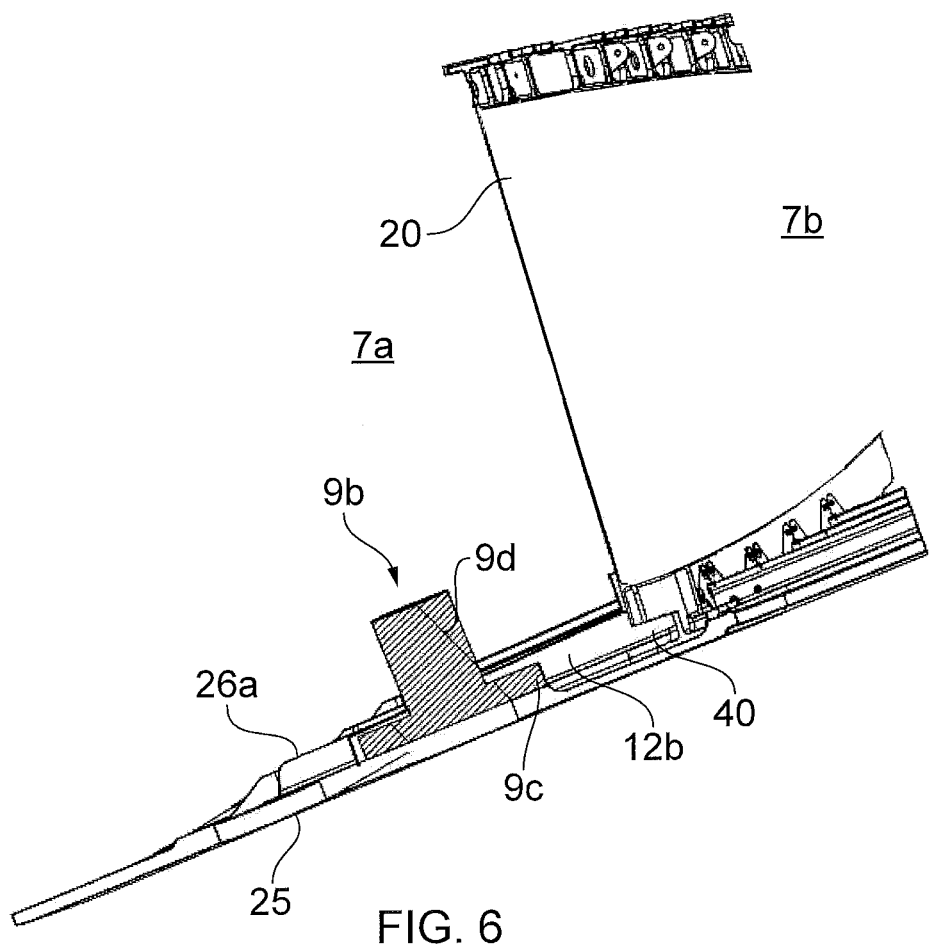
FIG. 6 is a perspective cross sectional side view through a rib between two fuel compartments, showing the fuel flow path to the fuel pump.

Note that the sealed recesses 21c and the open recess 40 are "mouse-hole" type openings at the bottom edge of the rib rather than closed holes bounded on all sides by the rib. Each recess 21c, 40 has a pair of side edges (provided by a pair of rib feet); an upper edge (provided by the bottom edge of the rib); but no lower edge. FIG. 6 for example shows one side edge of the open recess 40 and part of the upper edge of the open recess 40. Note that no part of the rib 20 lies between the open recess 40 and the lower skin 25.

Figure 12:
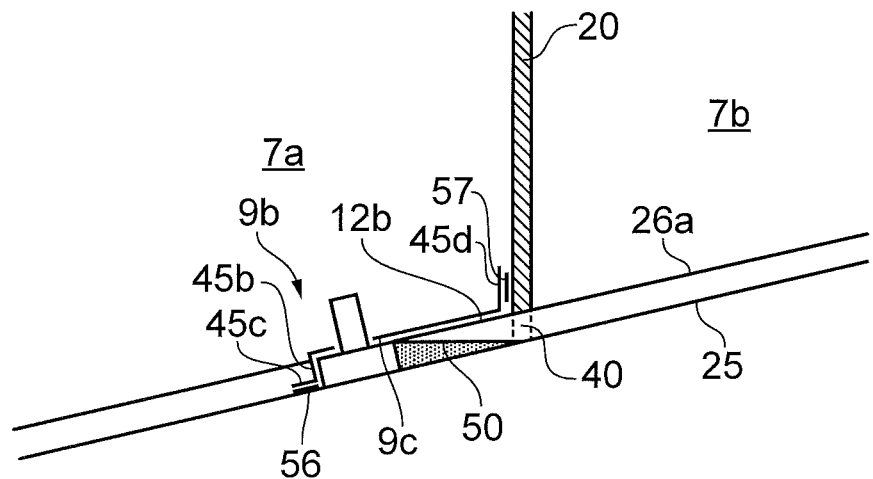
FIG. 12 is a schematic cross sectional view through the rib.

The open recess 40 enables fuel to flow across the rib 20 from the outboard compartment 7b into the conduit 12b as shown in FIGS. 6 and 12. The conduit 12b is fluidically coupled at one end to the open recess 40 and at another end to the fuel pump 9b, the open recess 40 and the conduit 12b together providing a flow path for fuel to flow across the bottom edge of the rib 20 from the outboard compartment 7b into the fuel pump 9b. The flow path is sealed, as described below, so that the fuel flowing along the flow path is prevented from flowing out of the flow path into the inboard compartment 7a which houses the pump 9b. There are no rib feet between the further pair of stringers 26a so fuel can flow unimpeded into the conduit 12b.

Figure 9:
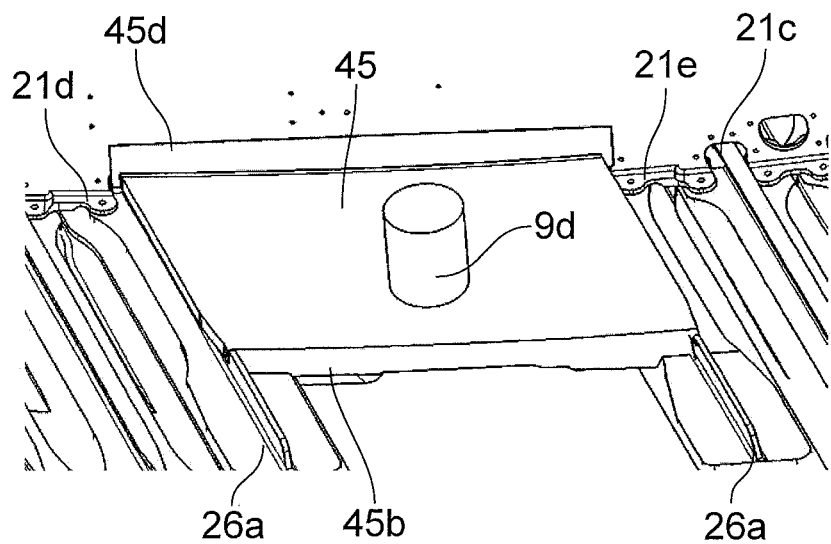
FIG. 9 is a perspective view showing the stringer cap.
Figure 10:
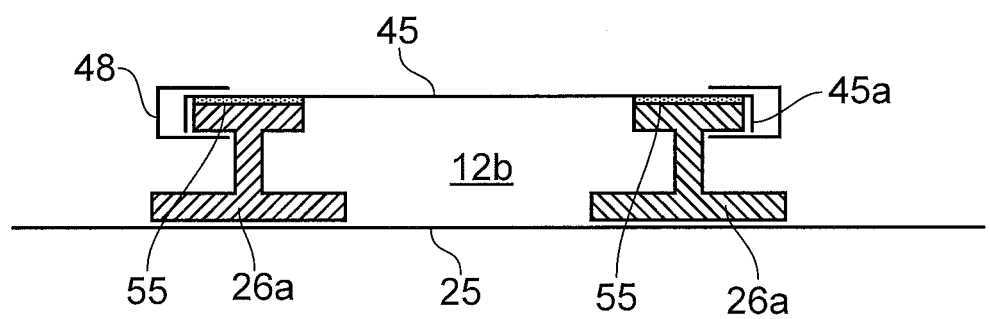
FIG. 10 is a schematic sectional view showing a first means for attaching the stringer cap to the further stringers.
Figure 11:
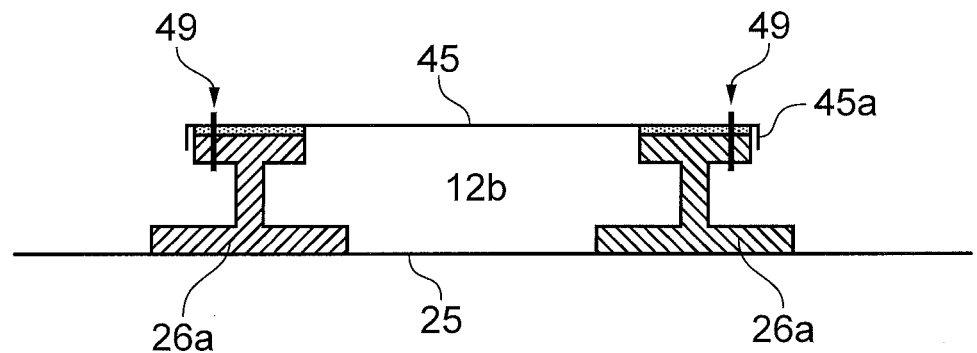
FIG. 11 is a schematic sectional view showing a second means for attaching the stringer cap to the further stringers.

FIG. 10 is a sectional view through the conduit 12b. The upper boundary of the conduit 12b is provided by a body 45 of a stringer cap, its lower boundary is provided by the bottom skin 25 and its sides are provided by the stringers 26a. Note that FIG. 10 is schematic only, and the spacing between the stringers 26a is reduced compared with FIG. 9.

The body 45 of the stringer cap extends between the pair of further stringers 26a, and the stringer cap has a pair of downwardly extending side flanges 45a which are fitted to the stringers 26a. The stringer cap is secured to the stringers 26a by a pair of clips 48 shown in FIG. 10 or by fasteners 49 shown in FIG. 11. A pair of polysulphide sealant layers or gaskets 55 form liquid-tight joints between the further stringers 26a and the body 45 of the stringer cap, to prevent fuel from flowing out of the conduit between the stringer cap and the stringer 26a and into the inboard compartment 7a.

The fuel pump 9b is shown schematically in cross-section in FIG. 6. The lower part of the fuel pump has an impeller (not shown) and a perforated cylindrical wall which provides an inlet 9c into the fuel pump. The upper part 9d of the fuel pump houses a motor (not shown) which drives the impeller so that the impeller draws fuel into the pump via the inlet 9c. The upper part 9d of the fuel pump leads to pipework (not shown) which feeds the fuel towards the engine 4 or some other part of the fuel system (for instance a different tank).

As shown in FIG. 9, the upper part 9d of the fuel pump protrudes through the body 45 of the stringer cap. A gasket or bead of polysulphide sealant (not shown) prevents fuel from flowing out of the conduit 12b between the body 45 of the stringer cap and the upper part 9d of the fuel pump and into the inboard compartment 7a.

The inboard end of the stringer cap has a vertical end wall 45b shown in FIG. 9, a horizontal inboard end flange 45c shown in FIG. 12, and a gasket or polysulphide sealant layer 56 which provides a liquid-tight joint preventing fuel from flowing out of the conduit 12b into the inboard compartment 7a between the inboard end flange 45c and the lower skin 25 or between the end wall 45b and the further stringers 26a.

Figure 8:
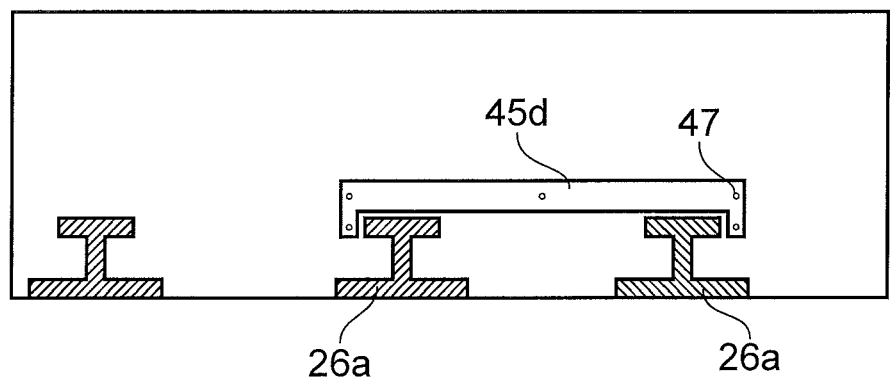
FIG. 8 is a schematic view showing the sealing arrangement between the stringer cap and the rib.

The outboard end of the stringer cap has an upwardly extending end flange 45d which is secured to the rib 20 by fasteners 47 shown in FIG. 8. Thus the stringer cap terminates at the rib 20 and the stringer cap does not pass through the open recess 40. A polysulphide sealant or gasket 57 shown in FIG. 12 seals the junction between the outboard end flange 45d and the rib 20. Thus the outboard end flange 45d forms a liquid-tight sealed joint between the stringer cap 45 and the rib 20 so that fuel flowing along the flow path is prevented from flowing out of the flow path into the inboard compartment 7a between the outboard end flange 45d and the rib 20.

FIG. 12 is a schematic sectional view of the rib 20. As can be seen in FIG. 12, the inlet 9c of the pump 9b is below the open recess 40 at the low point of the outboard compartment 7b, so fuel is gravity-fed into the pump 9b leaving no pool of residual fuel in the outboard compartment 7b against the rib 20 unlike in FIG. 3.

FIG. 12 shows a volume 50 of fuel in the conduit 12b which is flowing into the inlet 9c of the pump.

As shown in FIG. 12, the outboard end flange 45d is in the inboard compartment 7a and joined to the inboard face of the rib 20. Alternatively the stringer cap may pass through the open recess 40 from the inboard compartment 7a into the outboard compartment 7b so that the end flange 45d is located in the outboard compartment 7b where it is joined to the outboard face of the rib 20.

Figure 13:
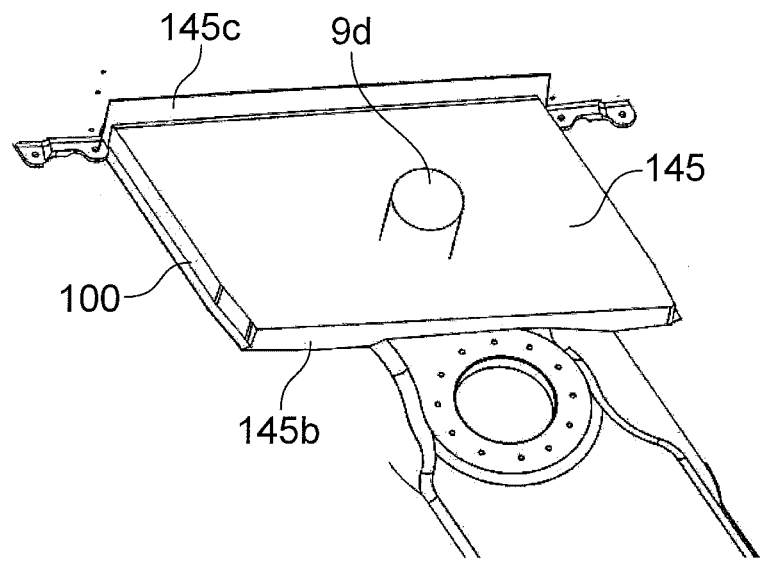
FIG. 13 is a perspective view of an alternative sealed fuel conduit formed by a fitting with a top-hat section.
Figure 14:
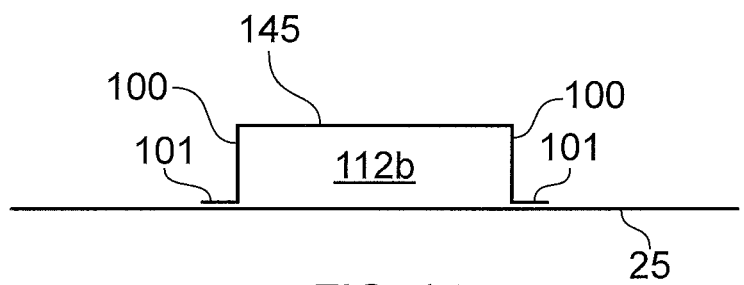
FIG. 14 is a schematic sectional view of the top-hat fitting.
Figure 15:
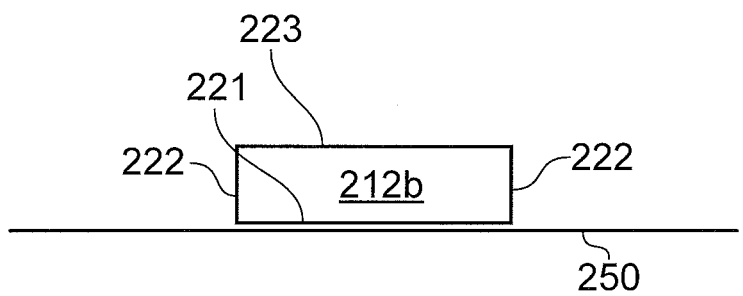
FIG. 15 is a schematic sectional view through an alternative sealed fuel conduit formed by a pipe with a closed section.

FIGS. 13 to 15 show two alternative embodiments of the invention in which the lower skin carries no stringers. The arrangement of each fuel compartment is generally the same as the fuel compartments shown in FIG. 2, and the fuel delivery arrangement also remains generally the same. The same reference numerals are used for corresponding features.

In the embodiment of FIGS. 13 and 14, a fitting with a top-hat section shown in FIG. 14 provides a conduit 112b which is coupled at one end to the open recess and at the other end to the pump. The upper boundary of the conduit 112b is provided by a body 145 of the fitting, its lower boundary is provided by the bottom skin 25, and its sides are provided by downwardly extending side walls 100 of the fitting. The side walls 100 have horizontal flanges 101 which are secured to the bottom skin 25 by fasteners (not shown). A polysulphide sealant or gasket (not shown) prevents fuel from flowing out of the conduit 112b into the inboard compartment between the horizontal flanges 101 and the bottom skin 25. The inboard and outboard ends of the fitting have end flanges 145b, 145c which are sealed in a similar manner to the end flanges 45c, 45d of the first embodiment.

In the embodiment of FIG. 15, the top-hat fitting is replaced by a closed-section pipe which provides a conduit 212b coupled at one end to the open recess 40 and at the other end to the pump 9b. The upper boundary of the conduit 212b is provided by an upper wall 223 of the pipe, its lower boundary is provided by a lower wall 221 of the pipe, and its sides are provided by side walls 222 of the pipe.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. An aircraft fuel system comprising:
   a bottom wall;
   a rib with a bottom edge joined to the bottom wall, the rib providing a boundary between first and second compartments, at least the first compartment being arranged to carry fuel when the system is in use; an open recess in the bottom edge of the rib;
   a rib sealing arrangement between the bottom edge of the rib and the bottom wall which prevents fuel from flowing across the bottom edge of the rib except at the open recess;
   a pump configured to pump fuel from the first compartment; and
   a conduit coupled to the open recess and to the pump, the open recess and the conduit together providing a flow path for fuel to flow across the bottom edge of the rib from the first compartment into the pump, wherein the flow path is sealed so that the fuel flowing along the flow path is prevented from flowing out of the flow path into the second compartment.

2. The system of claim 1 wherein the bottom edge of the rib comprises a plurality of rib feet joining the bottom edge of the rib to the bottom wall, and
   the system further comprises a plurality of sealed stringers which are carried by the bottom wall, each of the plurality of sealed stringers passing through a respective sealed recess between a respective pair of the plurality of rib feet;
   the rib sealing arrangement comprises a plurality of rib seal members each providing a seal which prevents fuel in the first compartment from flowing through a respective one of the sealed recesses into the second compartment; and
   a further pair of stringers which are carried by the bottom wall and pass through the open recess between a further pair of the plurality of rib feet, wherein the conduit is coupled to the open recess between the further pair of stringers.

3. The system of claim 2, wherein the conduit is provided by the bottom wall, the further pair of stringers and a stringer cap fitted to the further pair of stringers in the second compartment, and the stringer cap is sealed to the rib and to the further pair of stringers so that the fuel flowing along the flow path is prevented from flowing out of the flow path into the second compartment.

4. The system of claim 3, wherein the stringer cap is joined to the further pair of stringers by at least one of a clamp, clip and fastener.

5. The system of claim 3 wherein the stringer cap terminates at the rib.

6. The system of claim 3, wherein the stringer cap comprises an end flange which forms a sealed joint between the stringer cap and the rib so that fuel flowing along the flow path is prevented from flowing out of the flow path into the second compartment between the stringer cap and the rib.

7. The system of claim 6, wherein the end flange is joined to the rib by fasteners.

8. The system of claim 1, wherein the rib lies in a rib plane, the first compartment is positioned on a first side of the rib plane; and the conduit and pump are positioned on a second side of the rib plane.

9. The system of claim 1, wherein the second compartment is arranged to carry fuel when the system is in use.

10. The system of claim 1, wherein the first compartment is oriented so that it has a low point at the open recess.

11. The system of claim 1, further comprising a top wall, and a rib sealing arrangement between a top edge of the rib and the top wall which prevents fuel from flowing between the rib and the top wall.

12. The system of claim 1, wherein the rib lies in a rib plane, the first compartment is positioned on a first side of the rib plane; and the pump is positioned entirely on a second side of the rib plane.

13. The system of claim 1, wherein the rib lies in a rib plane, the first compai intent is positioned on a first side of the rib plane; and the pump comprises an inlet for feeding the fuel from the first compartment into the pump via the conduit, wherein the inlet is positioned on a second side of the rib plane.

14. The system of claim 1, wherein the pump is arranged to pump the fuel from the first compartment towards an engine, or some other part of the fuel system other than the second compartment.

15. The system of claim 1, wherein no part of the rib lies between the open recess and the bottom wall.

16. The system of claim 1, wherein a lower boundary of the conduit is provided by the bottom wall.

17. An aircraft wing comprising an aircraft fuel system according to claim 1, wherein the bottom wall of the fuel system is a bottom skin of the wing.

18. An aircraft comprising an aircraft fuel system according to claim 1.

19. The aircraft of claim 18 comprising a fuselage; and a wing which extends away from the fuselage, wherein the bottom wall of the fuel system is a bottom skin of the wing.

20. The aircraft of claim 19, wherein the bottom wall is angled upwardly as it extends away from the fuselage, the rib is an inboard rib which provides an inboard boundary of the first compartment, and the aircraft fuel system further comprises an outboard rib which is opposite the inboard rib and provides an outboard boundary of the first compartment positioned further away from the fuselage than the inboard boundary.

* * * * *